United States Patent
Brown et al.

(10) Patent No.: US 11,542,037 B2
(45) Date of Patent: Jan. 3, 2023

(54) METHODS AND APPARATUS TO DEPLOY UNMANNED AERIAL VEHICLES (UAVS) BY KITES

(71) Applicant: Insitu, Inc., Bingen, WA (US)

(72) Inventors: Benjamin T. Brown, Bingen, WA (US); Alice Fockele, Bingen, WA (US); Kelly A. Comstock, Bingen, WA (US); John Wong, Klickitat, WA (US); Jacob Allen, Bingen, WA (US); Daniel L. Shaw, White Salmon, WA (US); Jesse D. Kiewit, Bingen, WA (US)

(73) Assignee: INSITU, INC., Bingen, WA (US)

( * ) Notice: Subject to any disclaimer, the term of this patent is extended or adjusted under 35 U.S.C. 154(b) by 432 days.

(21) Appl. No.: 16/707,955

(22) Filed: Dec. 9, 2019

(65) Prior Publication Data

US 2021/0171217 A1     Jun. 10, 2021

(51) Int. Cl.
| | |
|---|---|
| *B64F 1/06* | (2006.01) |
| *B64C 39/02* | (2006.01) |
| *B64C 31/06* | (2020.01) |
| *B63G 11/00* | (2006.01) |

(52) U.S. Cl.
CPC ............ *B64F 1/06* (2013.01); *B63G 11/00* (2013.01); *B64C 31/06* (2013.01); *B64C 39/024* (2013.01); *B64C 2201/027* (2013.01); *B64C 2201/084* (2013.01)

(58) Field of Classification Search
CPC ......... B64C 31/06; B64C 39/024; B64F 1/04; B64F 1/06; B64F 1/10
See application file for complete search history.

(56) References Cited

U.S. PATENT DOCUMENTS

| | | | | |
|---|---|---|---|---|
| 2,669,403 A | * | 2/1954 | McKay | A63H 27/08 446/65 |
| 4,753,400 A | * | 6/1988 | Reuter | B64F 1/027 244/116 |
| 4,842,222 A | * | 6/1989 | Baird | A63H 27/087 244/155 A |
| 6,264,140 B1 | * | 7/2001 | McGeer | B64F 1/0295 244/116 |
| 6,874,729 B1 | * | 4/2005 | McDonnell | B64F 1/10 244/63 |

(Continued)

FOREIGN PATENT DOCUMENTS

| | | |
|---|---|---|
| EP | 3564124 | 11/2019 |
| WO | 9715490 | 5/1997 |

(Continued)

OTHER PUBLICATIONS

European Patent Office, "Extended European Search Report," issued in connection with European Patent Application No. 20212007.7, dated May 4, 2021, 9 pages.

(Continued)

*Primary Examiner* — Michael H Wang
(74) *Attorney, Agent, or Firm* — Hanley, Flight & Zimmerman

(57) ABSTRACT

Methods and apparatus to deploy unmanned aerial vehicles (UAVs) by kites are disclosed. An example apparatus to deploy a UAV includes a tether line to support the UAV, a tensioner operatively coupled to the tether line, and a kite operatively coupled to the tether line to support the tether line for deployment of the UAV.

21 Claims, 15 Drawing Sheets

(56) References Cited

U.S. PATENT DOCUMENTS

| | | | |
|---|---|---|---|
| 7,097,137 B2* | 8/2006 | McDonnell | B64D 3/00 244/110 F |
| 10,640,233 B2* | 5/2020 | Miller | B64C 31/06 |
| 11,008,101 B2* | 5/2021 | Miller | B66D 1/60 |
| 11,142,339 B2* | 10/2021 | Dennis | B64C 39/022 |
| 2005/0017129 A1 | 1/2005 | McDonnell | |
| 2009/0033098 A1 | 2/2009 | Griffith et al. | |
| 2015/0153741 A1 | 6/2015 | North et al. | |
| 2016/0221689 A1 | 8/2016 | Tridico | |
| 2021/0171216 A1 | 6/2021 | Brown et al. | |

FOREIGN PATENT DOCUMENTS

| | | |
|---|---|---|
| WO | 0075014 | 12/2000 |
| WO | 0107318 | 2/2001 |
| WO | 2018189324 | 10/2018 |

OTHER PUBLICATIONS

United States Patent and Trademark Office, "Non-Final Office Action," issued in connection with U.S. Appl. No. 16/707,971, dated Jul. 6, 2022, 26 pages.

United States Patent and Trademark Office, "Non-Final Office Action," issued in connection with U.S. Appl. No. 16/707,971, dated Oct. 5, 2021, 20 pages.

United States Patent and Trademark Office, "Final Office Action," issued in connection with U.S. Appl. No. 16/707,971, dated Feb. 14, 2022, 16 pages.

United States Patent and Trademark Office, "Advisory Action," issued in connection with U.S. Appl. No. 16/707,971, dated May 2, 2022, 5 pages.

United States Patent and Trademark Office, "Final Office Action," issued in connection with U.S. Appl. No. 16/707,971, dated Aug. 31, 2022, 22 pages.

* cited by examiner

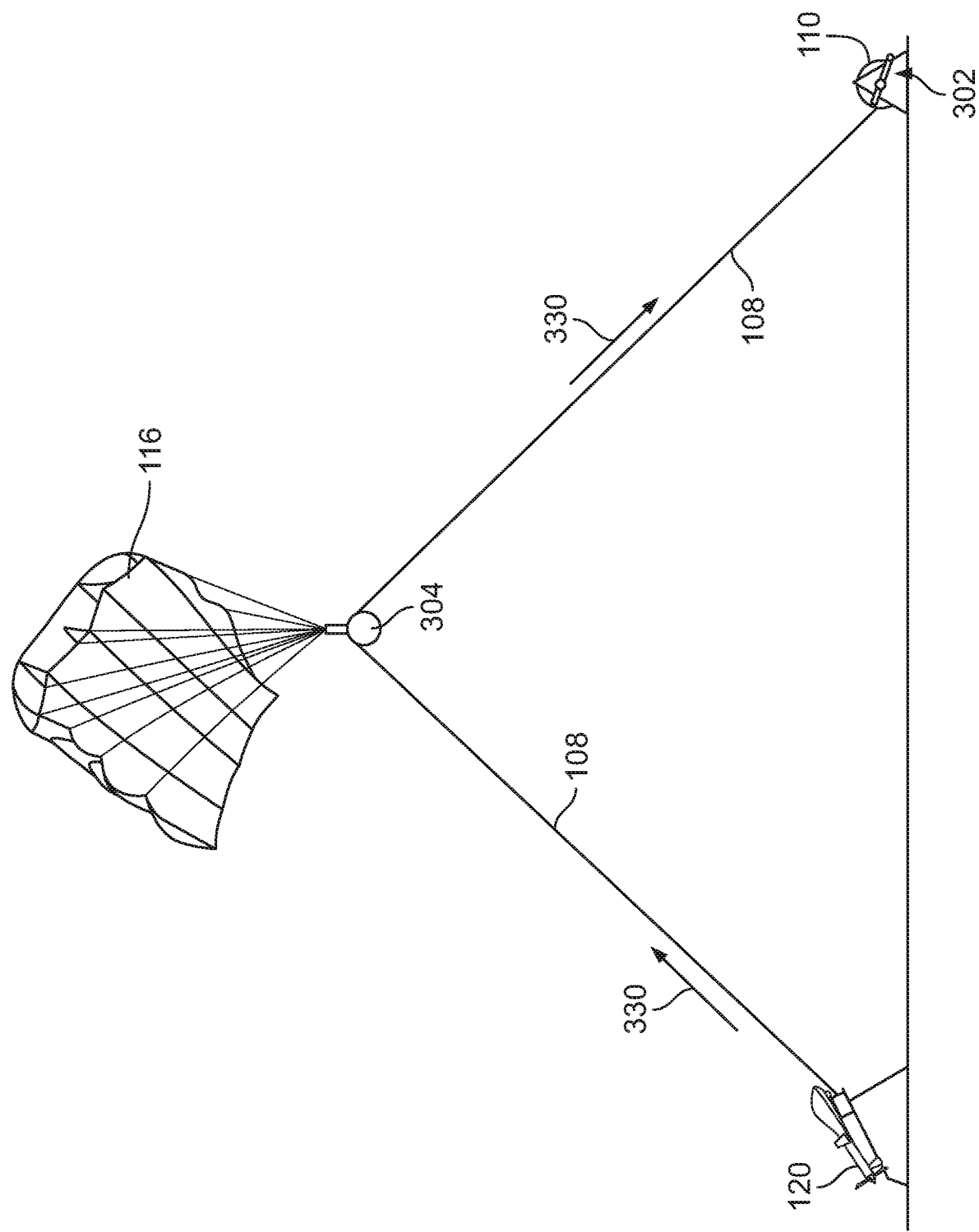

US 11,542,037 B2

METHODS AND APPARATUS TO DEPLOY UNMANNED AERIAL VEHICLES (UAVS) BY KITES

FIELD OF THE DISCLOSURE

This disclosure relates generally to aircraft and, more particularly, to methods and apparatus to deploy unmanned aerial vehicles (UAVs) by kites.

BACKGROUND

In recent years, unmanned aerial vehicles (UAVs) or drones have been used to fly significant distances to transport payloads (e.g., packages, supplies, equipment, etc.) or gather information. Some UAVs take off from runways while others are launched by UAV deployment systems. Deploying UAVs without the use of a runway enables greater flexibility in launch locations. In particular, a UAV can be launched from an unprepared or relatively small area.

SUMMARY

An example apparatus to deploy an unmanned aerial vehicle (UAV) includes a tether line to support the UAV, a tensioner operatively coupled to the tether line, and a kite operatively coupled to the tether line to support the tether line for deployment of the UAV.

An example method of deploying a UAV includes raising a tether line via a kite operatively coupled thereto, where the tether line is to support the UAV, and releasing the UAV to deploy the UAV.

An example non-transitory machine readable medium includes instructions, which when executed, cause a processor to determine a position of at least one of a tether line or a kite supporting the tether line, where the tether line supports a UAV, and direct movement of the kite based on a desired launch flight path of the UAV.

BRIEF DESCRIPTION OF THE DRAWINGS

FIGS. 3A-3C depict another alternative example UAV deployment system.

Figure 1:
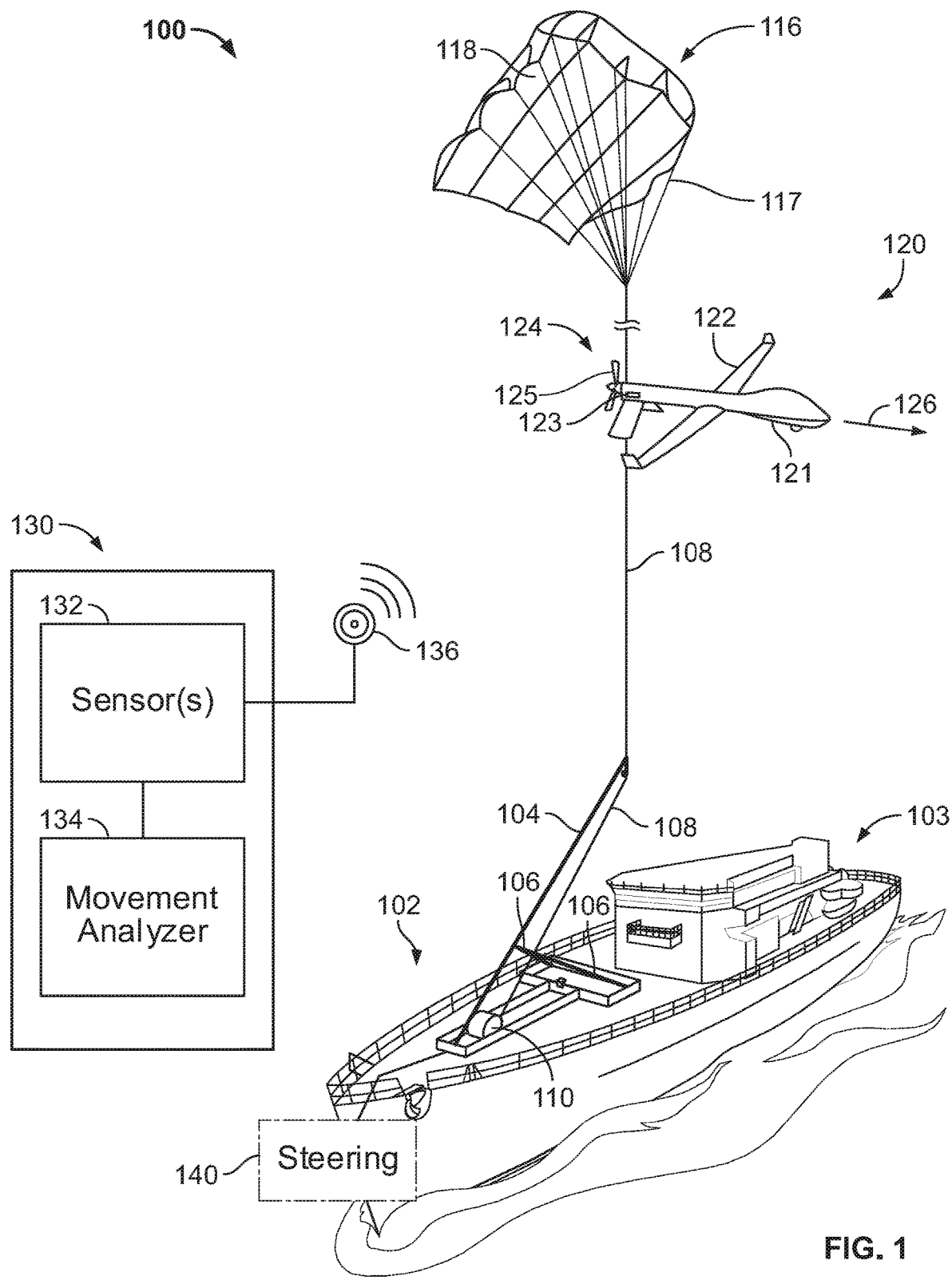
FIG. 1 depicts an unmanned aerial vehicle (UAV) deployment system in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to deploy unmanned aerial vehicles (UAVs) by kites are disclosed. Some UAVs are launched by deployment systems that employ a tether line that supports a UAV. In particular, a parachute or support beam or movable boom is used to suspend the tether line for deployment of the UAV. Accordingly, the UAV is deployed by releasing and/or dropping the UAV from the tether line.

Examples disclosed herein enable an effective and relatively low cost deployment of an aircraft (e.g., a UAV) via a stationary platform or a moving vehicle and/or vessel, such as a ship, for example. In particular, a kite (e.g., a parafoil kite) extends from a boat or a stationary platform and generates lift to support and/or suspend a tether line carried by a vessel. The tether line supports and/or carries the aircraft and is operatively coupled to a tension device (e.g., a tensioner, a winch, a motorized winch, etc.).

In some examples, the kite is steerable to maneuver and/or direct movement of the kite for deployment of the aircraft. In some such examples, the kite is steerable via at least one steering line to enable the aircraft to be launched at or proximate a desired launch flight path. In some examples, the tether line raises the aircraft via a platform (e.g., a movable platform) so that the aircraft can be dropped or catapulted during deployment. In some such examples, the platform is guided and/or moves along the tether line.

FIG. 1 depicts a UAV deployment system 100 in accordance with teachings of this disclosure. The UAV deployment system 100 of the illustrated example is implemented to deploy a UAV 120 and includes a tether line control mount 102, which is mounted onto a vessel (e.g., a ship) 103 and includes a boom (e.g., a lower tether boom, a rotatable boom, a swivel boom, a pivoting boom, etc.) 104 and boom supports 106. In the illustrated example, a tether line 108 extends from the tether line control mount 102, and a tensioner or tension device 110, which is implemented as a winch in this example, is operatively coupled to the tether line 108. In turn, the tether line 108 is operatively coupled to a kite (e.g., a parafoil kite) 116 having support lines (e.g., kite lines, foil lines, etc.) 117 and a foil (e.g., a lift foil, a lift generation foil, a kite body) 118.

The example UAV 120 includes a fuselage 121, wings 122, a release device 123, and a propulsion system 124 with propellers 125. In this example, the release device 123 extends from the corresponding fuselage 121. However, any appropriate type of release/attachment mechanism can be, instead, implemented on any other portion and/or component (e.g., one of the wings 122) of the UAV 120. Further any other appropriate type of propulsion of the UAV 120 can be implemented instead.

To deploy and/or launch the UAV 120, the kite 116 generates lift and raises the tether line 108 along with the UAV 120, which is releasably coupled to the tether line 108 via the release device 123 in this example. In response to the UAV 120 being positioned at the desired height and/or orientation, the UAV 120 is released from the tether line 108 by the release device 123 and the propellers 125, in turn, cause movement of the UAV 120 away from the tether line 108. In other words, the UAV 120 is released and dropped from the tether line 108 in this example. In this particular example, the tether line 108 is suspended by the kite 116 at a substantially vertical orientation in the air (e.g., within 5 degrees from vertical). However, any appropriate orientation of the tether line 108 can be implemented instead.

In some examples, the tensioner 110 maintains a tension of the tether line 108 extending between the tether line control mount 102 and the kite 116 within a threshold range and/or at a nominal tension value while the UAV 120 is suspended by the tether line 108 and the kite 116. Additionally or alternatively, the kite 116 is steered to direct movement of the UAV 120 within a requisite range of a desired launch flight path (e.g., a desired launch vector, a planned launch trajectory, etc.) 126. For example, the kite 116 can be steered to translate and/or orient the UAV 120 toward the launch flight path 126. Additionally or alternatively, the kite 116 is steered to vary a speed and/or acceleration of the UAV 120 (e.g., movement of the kite 116 is utilized to accelerate the UAV 120 prior to or during launch).

In some examples, the UAV deployment system 100 includes a movement controller 130, which includes at least one sensor 132, a movement analyzer 134 and a transceiver 136, as well as a steering actuator 140. In some such examples, movement of the kite 116 is coordinated with movement of the vessel 103 by the movement controller 130 to direct the UAV 120 toward the desired launch flight path 126 when the UAV 120 is released from the tether line 108. In some examples, the movement controller 130 directs movement of the steering actuator 140 and, thus, the kite 116 carrying and/or supporting the UAV 120.

Figure 2A:
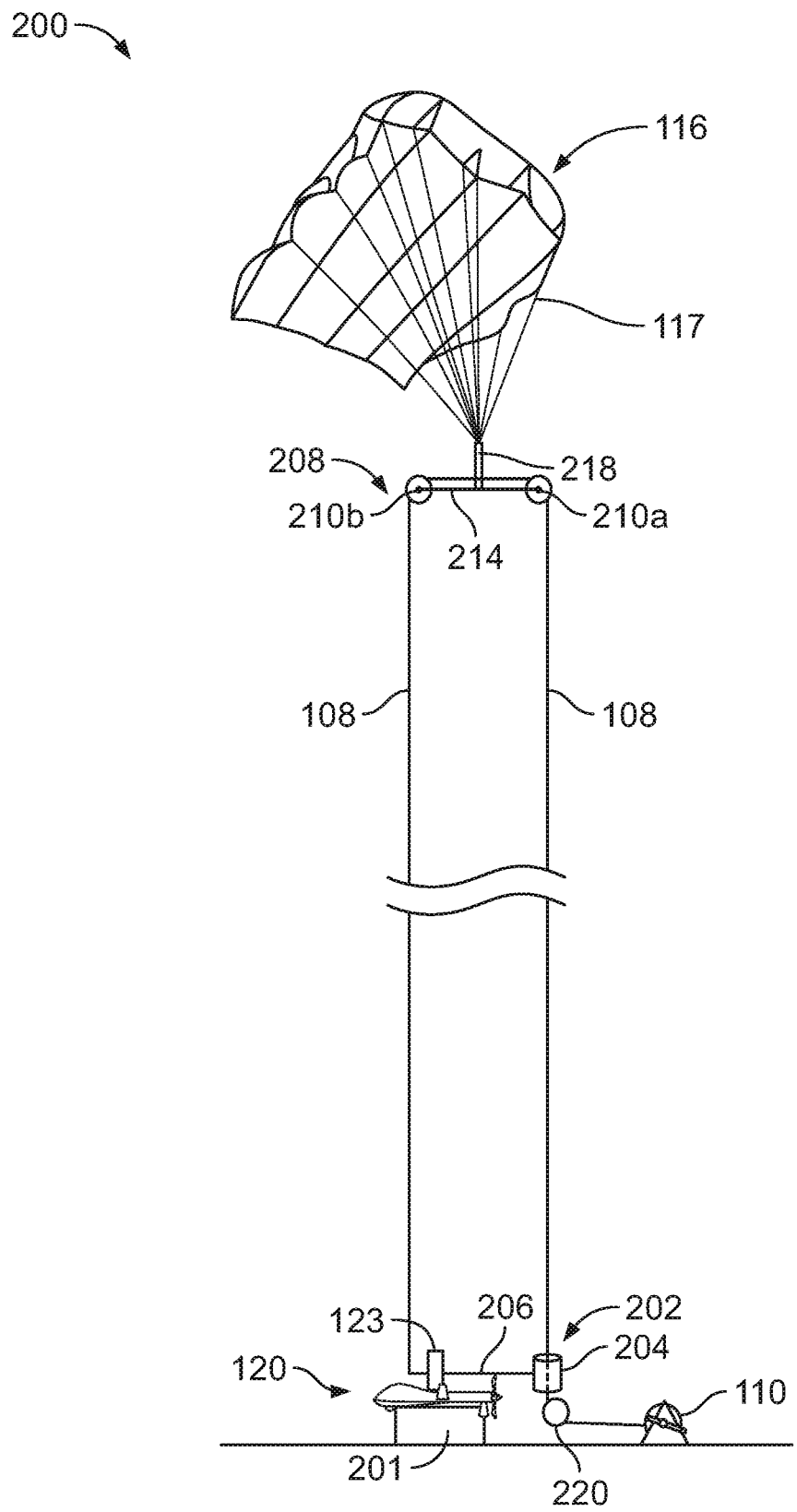
FIGS. 2A-2C depict an alternative example UAV deployment system.
Figure 2B:
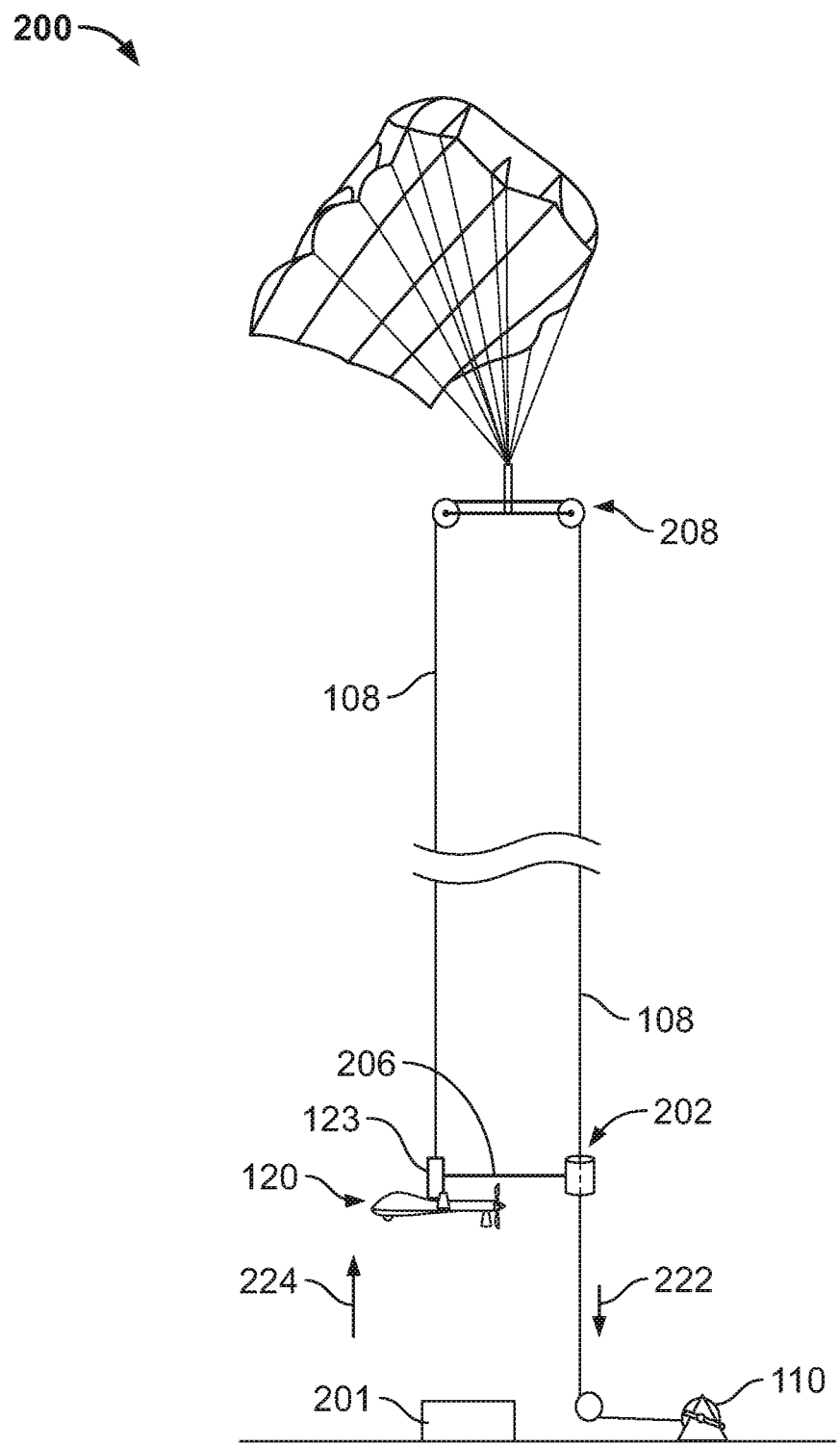
Figure 2C:
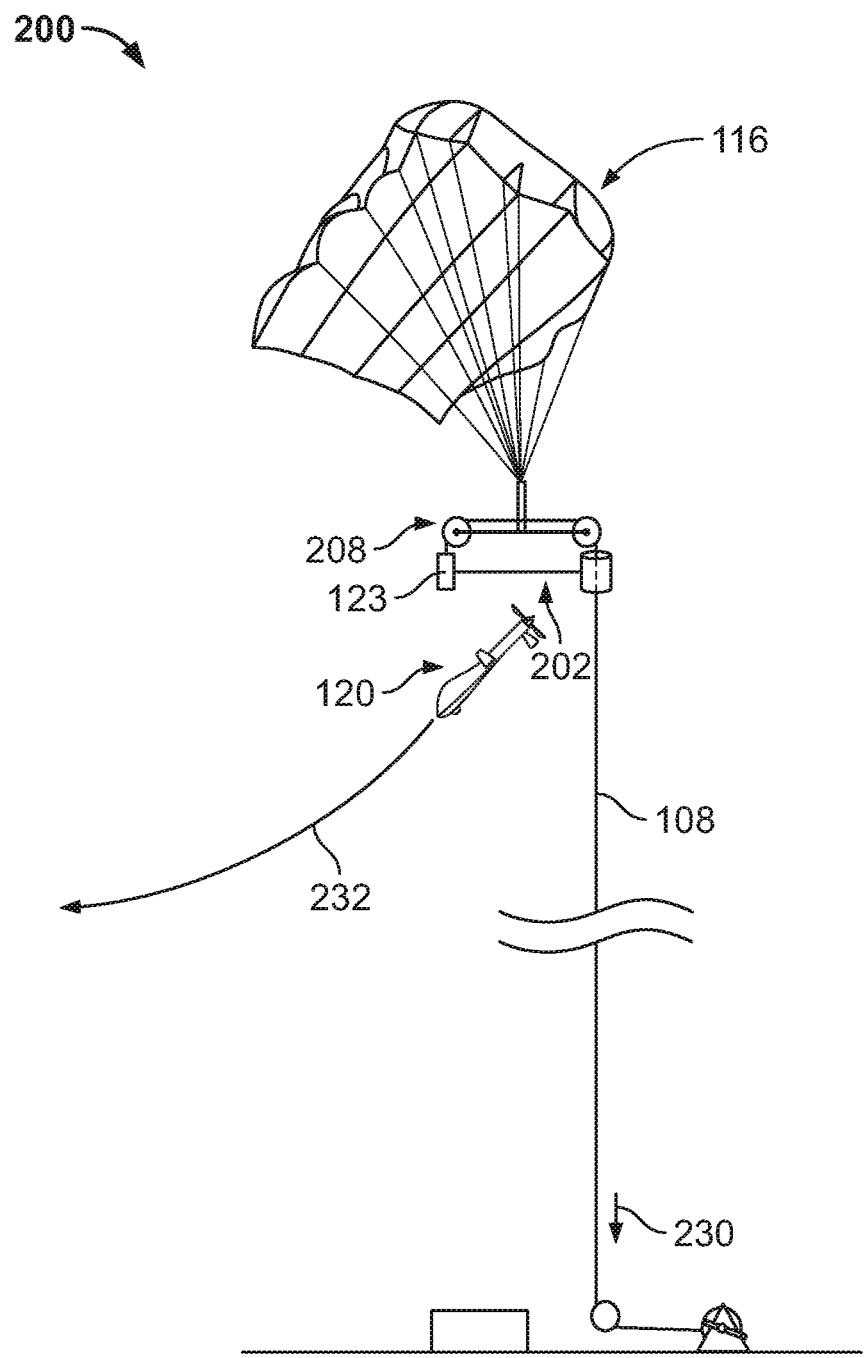

FIGS. 2A-2C depict an alternative example UAV deployment system 200. Turning to FIG. 2A, the UAV deployment system 200 of the illustrated example includes a stand (e.g., a ground stand) 201 to support the UAV 120 relative to the ground, and a lower movable platform (e.g., a carriage, a catapult vehicle, a launcher, etc.) 202 which, in turn, includes a guide (e.g., a track guide, a cylinder guide, a tension line guide, etc.) 204 that moves along the tether line 108, and a platform base 206. The UAV deployment system 200 also includes an upper stationary platform 208, which includes pulleys 210 (hereinafter pulleys 210a, 210b, etc.), an upper platform base 214 and a kite mount 218 from which the support lines 117 of the kite 116 extend.

In the illustrated example, the tether line 108 extends from the tensioner 110 toward a pulley 220 and through the guide 204. As the tether line 108 passes through the guide 204, the tether line 108 is suspended substantially vertically (e.g., within 5 degrees from vertical) between the pulley 210a and the pulley 220. Further, the tether line 108 is guided by the platform base 214 as it passes from the pulley 210a to the pulley 210b. The tether line 108 then extends substantially vertically from the pulley 210b to the platform base 206.

In this example, the UAV 120 is removably coupled to the platform base 206. In particular, the platform base 206 supports and positions the UAV 120 prior to the UAV 120 being deployed. Further, the UAV 120 is removably coupled to the platform base 206 via the release device 123. As seen in the illustrated example of FIG. 2A, the UAV 120 is initially placed onto the stand 201 prior to commencing deployment of the UAV 120.

To raise the lower movable platform 202 along the with the UAV 120 for deployment thereof, the tensioner 110 pulls the tether line 108 away from the movable platform 202 (to the right in the view of FIG. 2A). As the tether line 108 is pulled, a portion of the tether line 108 extending vertically from the pulley 210b pulls the platform base 206 upward while the guide 204 maintains the movable platform 202 at a substantially horizontal orientation (in the view of FIG. 2A). As a result, the movable platform 202 is brought closer to the upper stationary platform 208 while maintaining the UAV 120 at a desired orientation for deployment thereof. In other words, the tether line 108 acts as a track for the movable platform 202 in this example. In some examples, multiple ones of the UAV 120 are coupled to the platform base 206.

FIG. 2B depicts the UAV deployment system 200 at a different timestep from that shown in FIG. 2A. In this example, movement of the tether line 108 along a direction generally indicated by an arrow 222 causes the movable platform 202 to be moved relative to the stand 201 and, thus, the UAV 120 has been raised to be closer to the upper stationary platform 208, as generally indicated by an arrow 224. As the UAV 120 is being raised to a desired height, the UAV 120 remains coupled to the platform base 206 via the release device 123.

FIG. 2C depicts the UAV deployment system 200 at a time step corresponding to the UAV 120 being deployed. In the illustrated example, the movable platform 202 has ascended to at least be proximate (e.g., in contact with) the stationary platform 208, which is suspended from the ground by the kite 116. In this example, movement of the tether line 108, as generally indicated by an arrow 230, is restricted as the movable platform 202 contacts the stationary platform 208, thereby preventing further movement of the tether line 108. Accordingly, the UAV 120 is released and/or dropped from the movable platform 202 via the release device 123, as generally indicated by an arrow 232. In some examples, the UAV 120 initiates its propulsion system prior to being released from the movable platform 202.

Figure 3A:
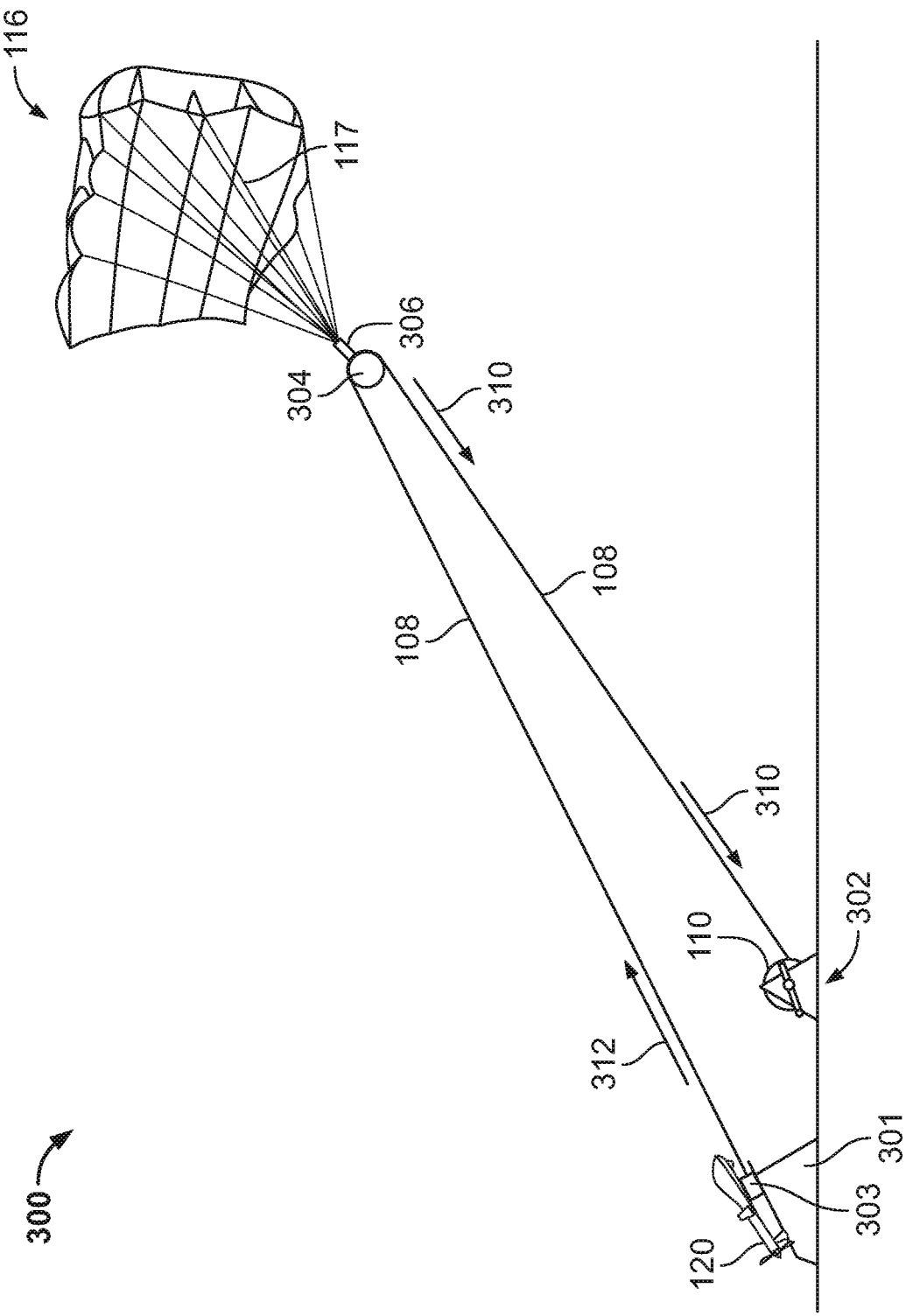
Figure 3B:
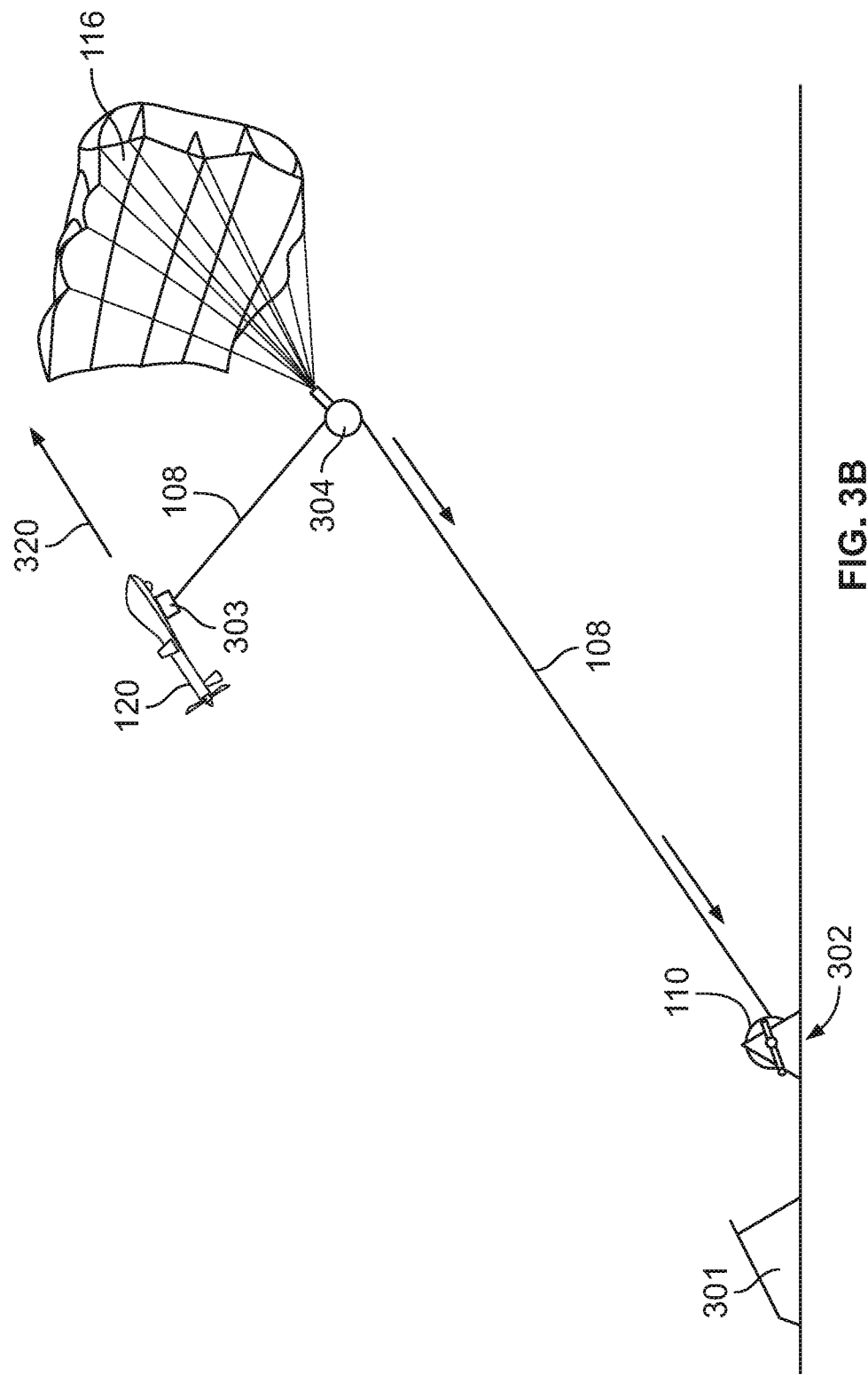

FIGS. 3A-3C depict another alternative example UAV deployment system 300. In contrast to raising the UAV 120 for deployment as depicted in conjunction with the example UAV deployment systems 100, 200 of FIGS. 1 and 2, respectively, the UAV deployment system 300 catapults the UAV 120 using the tether line 108. Turning to FIG. 3A, The UAV deployment system 300 includes a stand 301, a mount 302, a moving release device (e.g., a catapult mount, a releasable mount, etc.) 303, a pulley (e.g., a distal pulley) 304, and a kite mount 306, which is attached to the support lines 117 and, thus, the kite 116. In this example, the tether line 108 is angled from the ground based on the relative positioning of the pulley 304 and the mount 302.

To launch the UAV 120, the tensioner 110 at the mount 302 pulls the tether line 108 towards itself, as generally indicated by arrows 310. In turn, a portion of the tension line 108 closer to the UAV 120 moves in a direction generally indicated by an arrow 312 and, thus, pulls on the UAV 120, thereby causing the UAV 120 to be launched from the stand 301.

FIG. 3B depicts the UAV deployment system 300 as the UAV 120 is being launched. In the illustrated example, the tether line 108 continues to be drawn toward the mount 302 by the tensioner 110 and a portion of the tether line 308 closer to the UAV 120 has significantly changed orientation as the tether line 308 remains attached to the UAV 120 via the release device 303. Further, the pulley 304 remains suspended by the kite 116. In this example, the UAV 120 is airborne, as generally indicated by an arrow 320, prior to the release device 303 releasing the UAV 120 from the tether line 108.

FIG. 3C depicts the UAV deployment system 300, but with the mount 302 positioned differently from that shown in FIGS. 3A and 3B. In particular, the mount 302 and the tensioner 110 are placed at a further distance from the UAV 120 than the pulley 304, which is supported by the kite 116. In this example time step, the UAV 120 is launched and/or deployed when the tensioner 110 pulls on the tether line 108, as generally indicated by arrows 330.

Figure 4A:
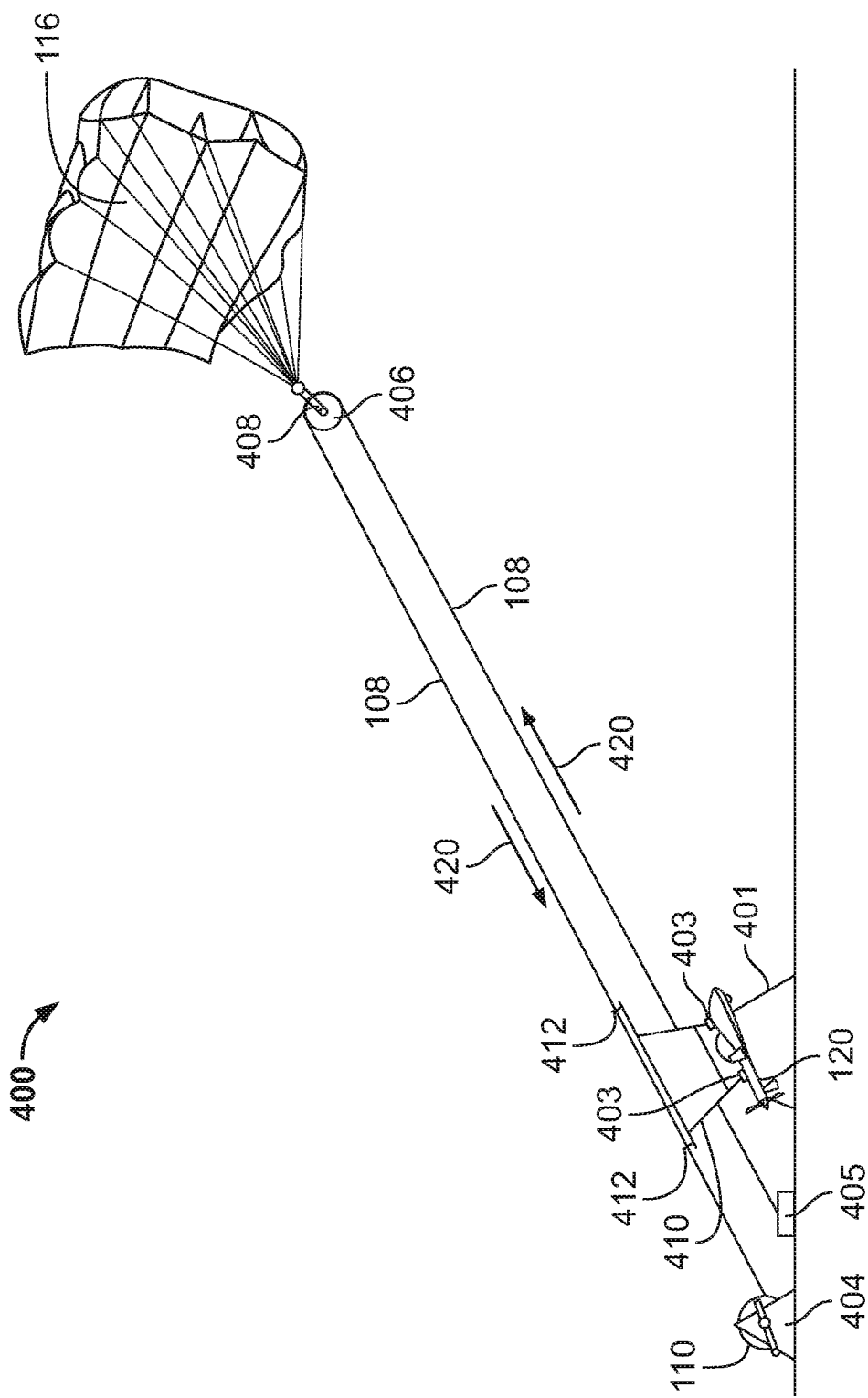
FIGS. 4A and 4B depict yet another alternative example UAV deployment system.
Figure 4B:
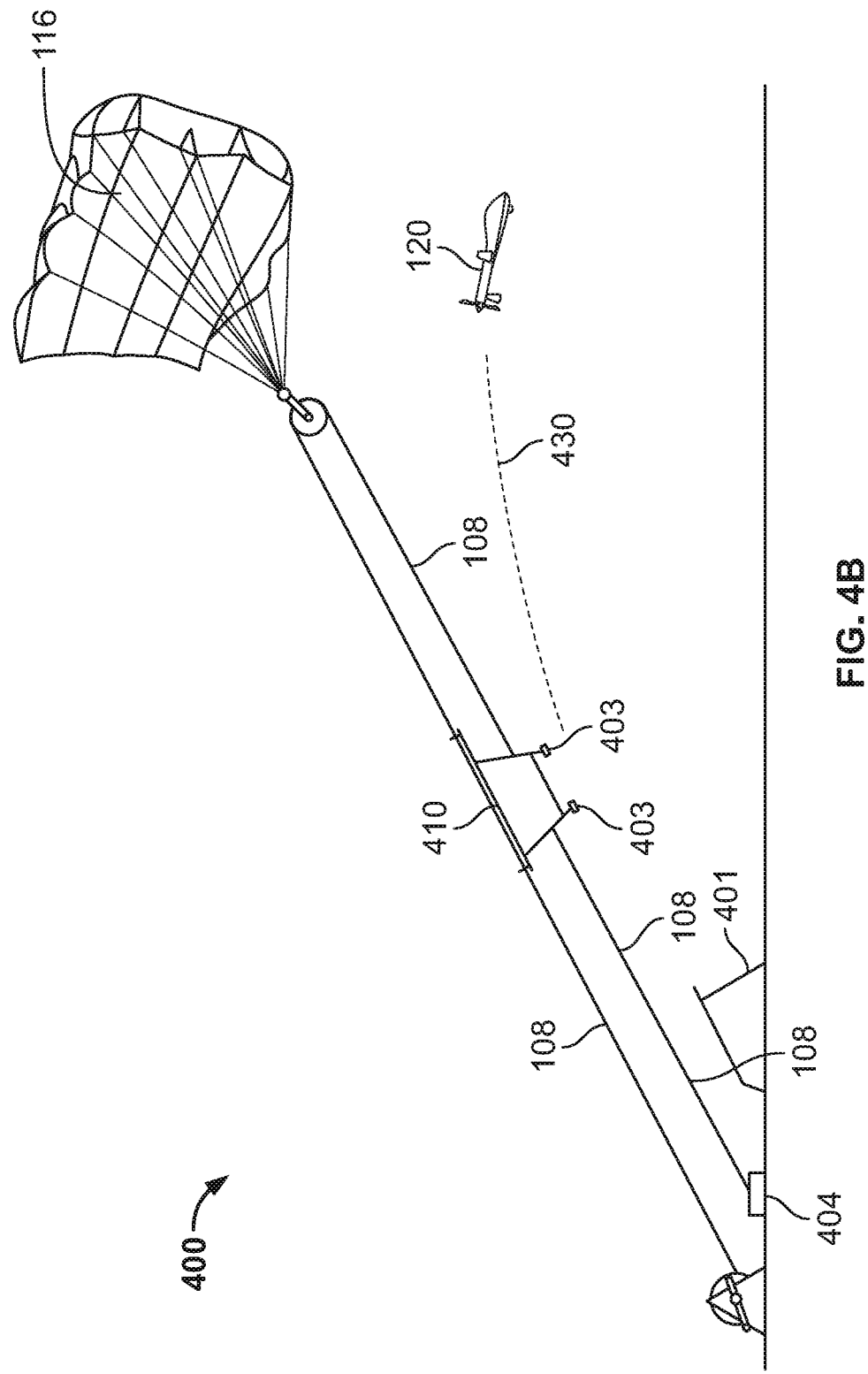

FIGS. 4A and 4B depict yet another alternative example UAV deployment system 400. Turning to FIG. 4A, the UAV deployment system 400 is implemented for a guided launch of the UAV 120. In the illustrated example, the UAV deployment system 400 includes a stand 401, release devices 403, a stand 404 with the tensioner 110, a stand 405, a pulley 406, a kite mount 408 coupled to the kite 116, and a platform (e.g., a carriage) 410 with openings 412. In this example, the tether line 108 extends from the stand 405 to the pulley 406, through the openings 412 and, in turn, the stand 404.

To launch the UAV 120 from the stand 401, the tensioner pulls tether line 108 in a direction generally indicated by arrows 420. As a result of the platform 410 and/or the UAV 120 releasably gripping (e.g., via releasable cable grips) the tether line 108, the UAV 120 and the platform 410 are moved toward the kite 116 and once the UAV 120 and the platform 410 reach a sufficient speed and/or altitude, the release devices 403 are operated to release the UAV 120 from the platform 410. The general movement of the platform 410 is guided by the tether line 108 passing through the openings 412. There is relatively little friction between the openings 412 and the tether line 108 so that a downward motion of the platform 410 is reduced (e.g., eliminated) while the platform is being moved toward the kite 116 during deployment of the UAV 120. In other words, the tether line 108 acts as a track (e.g. a guide track) for the platform 410.

Turning to FIG. 4B, a later time step of the UAV deployment system 400 is shown in comparison to that shown in FIG. 4A. In the illustrated view of FIG. 4B, the platform 410 remains positioned on the tether line 108 and is displaced away from the mount 404. In the illustrated example, the UAV 120 deployed, released by the release devices 403, and in flight, as generally indicated by an arrow 430. In this example, the UAV 120 is angled away from the kite 116 during deployment. In this example, the platform 410 remains movably coupled to the tether line 108 and, thus, the UAV deployment system 400 can be easily reset for additional aircraft deployments.

Figure 5:
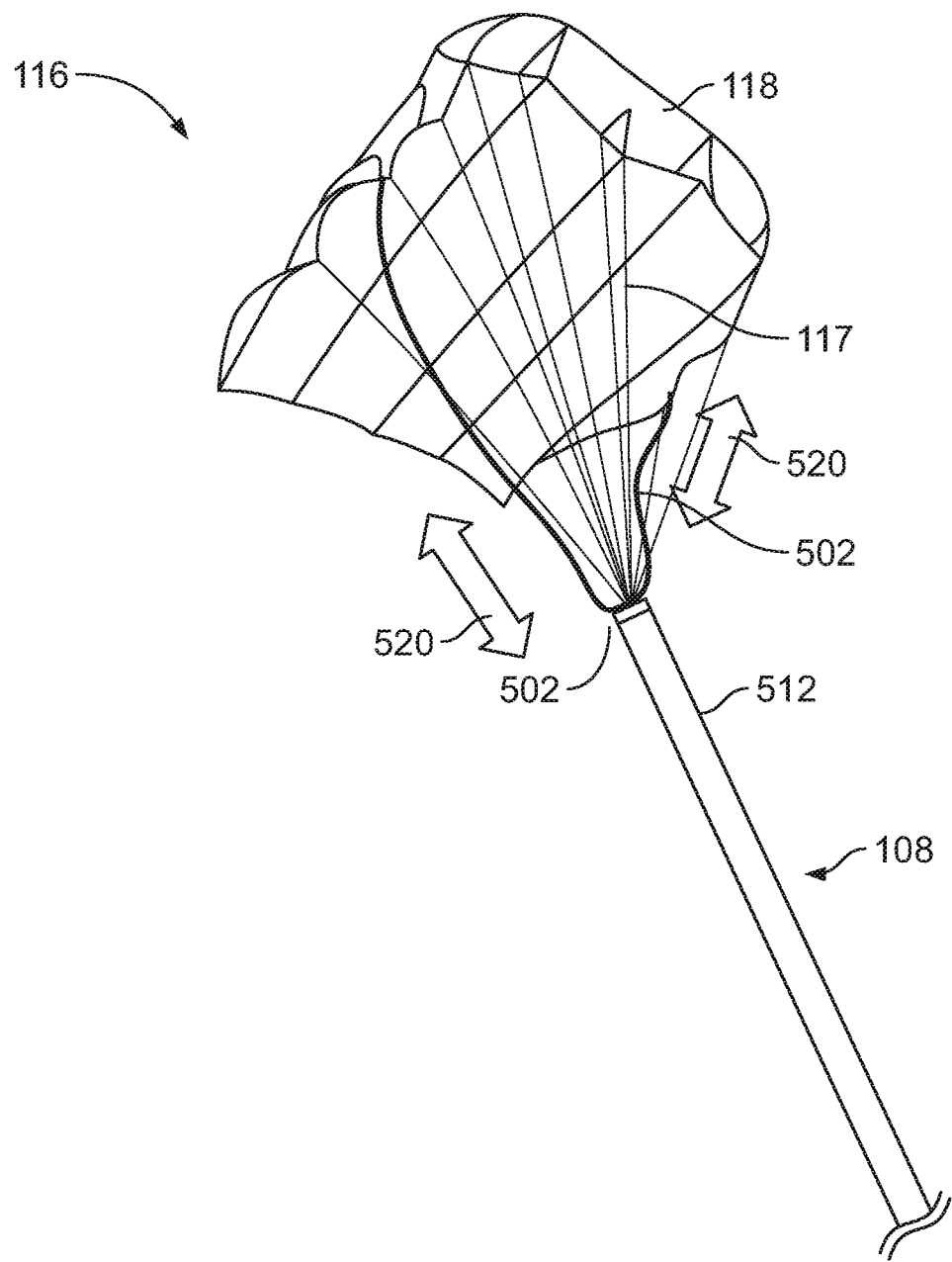
FIG. 5 is a detailed view of an example kite that can be implemented in examples disclosed herein.

FIG. 5 is a detailed view of the example kite 116 that can be implemented in examples disclosed herein. In the illustrated example, the kite 116 includes the aforementioned support lines 117, as well as the foil 118. Further, steering lines 502 are shown extending from a main cable portion (e.g., a cable bundle, a cable assembly, etc.) 512 of the tether line 108. In particular, the steering lines 502 are housed and protected within the main cable portion 512. In this example, the steering lines 502 are operatively coupled to the foil 118. However, in some other examples, a first one of the steering lines 502 is coupled to a first set of the support lines 117 while a second one of steering lines 502 is coupled to a second set of the support lines 117. In other words, the steering lines 502 can be coupled to different ones of the support lines 117 to enable controlled movement of the kite 116. In some examples, the support lines 117 are integral with the steering lines 502.

To steer the kite 116 relative to the vessel 103 (shown in FIG. 1) for deployment and/or launch of the UAV 120, at least one of the steering lines 502 is displaced linearly, as generally indicated by arrows 520, to re-orient the foil 118 and vary a direction of lift of the kite 116. In particular, the steering lines 502 have movable portions (e.g., calipers, movable wires, etc.) that are enclosed within at least one cable that extends through the aforementioned main cable portion 512 of the tether line 108. In other words, the steering lines 502 can be translated (e.g., linearly translated) relative to the main cable portion 512.

While two of the steering lines 502 are shown in this example, any appropriate number of the steering lines 502 can be implemented instead (e.g., one, three, four, five, six, ten, twenty, fifty, etc.). Further, any other appropriate type of steering mechanism for the kite 116 can be implemented instead.

Figure 6:
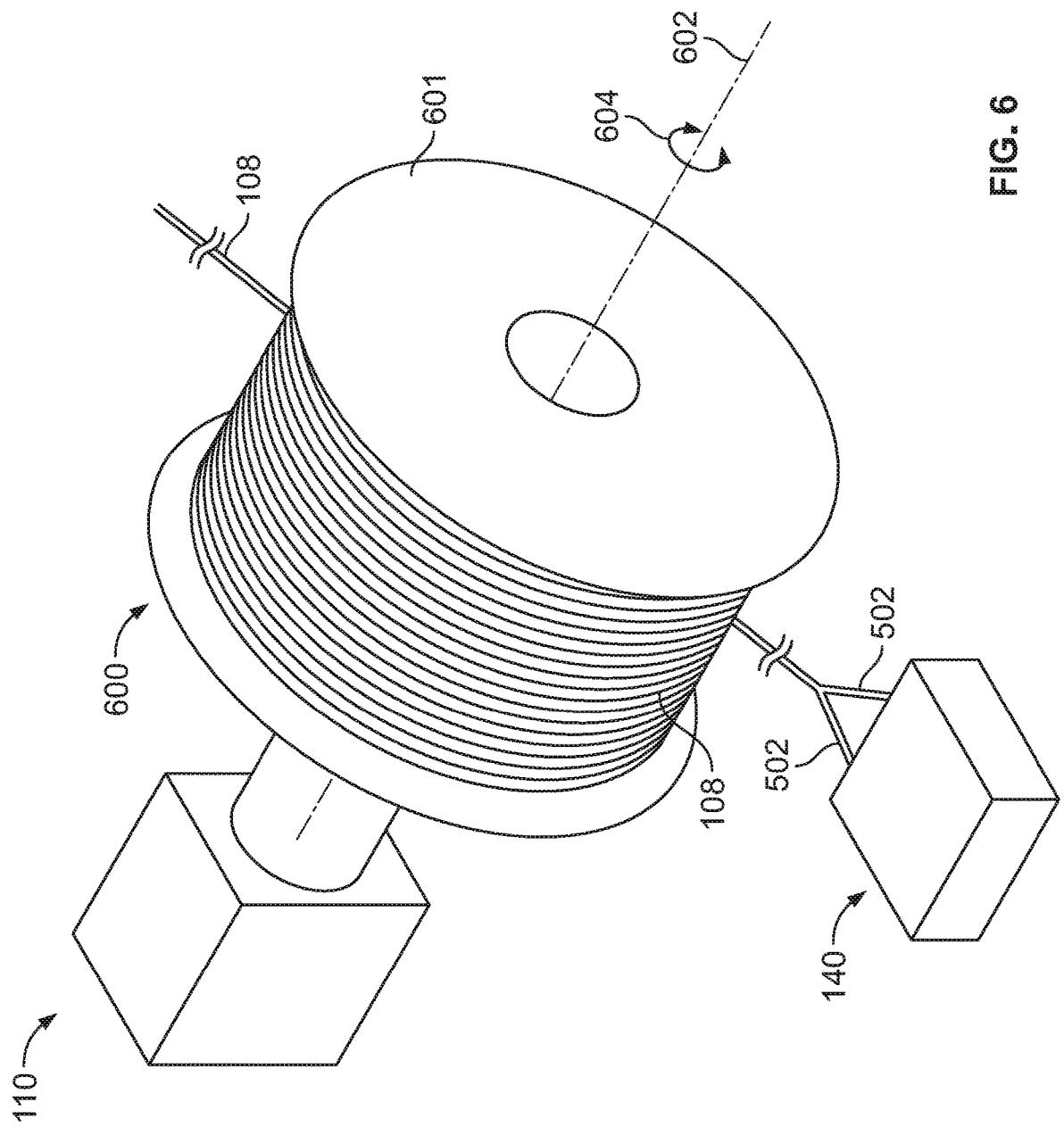
FIG. 6 depicts an example tether line spool implementation that can be implemented in examples disclosed herein.

FIG. 6 depicts an example tether line spool implementation 600 that can be implemented in examples disclosed herein. In the illustrated example of FIG. 6, the tether line 108 is depicted coiled onto the spool 601 with a portion of the tether line 108 extending from the spool 601 toward the steering actuator 140 while another portion of the tether line 108 extends toward the kite 116 (not shown).

In operation, the spool 601 is caused to rotate by the tensioner 110, which is implemented as a motorized winch in this example, about an axis (e.g., a rotational pivot axis) 602, as generally indicated by a double arrow 604. In this example, the steering actuator 140 causes movement of at least one of the steering lines 502 which, in turn, translates the steering lines 502 along the tether line 108 to steer the kite 116. In other words, the kite 116 can be steered from the vessel 103.

Figure 7:
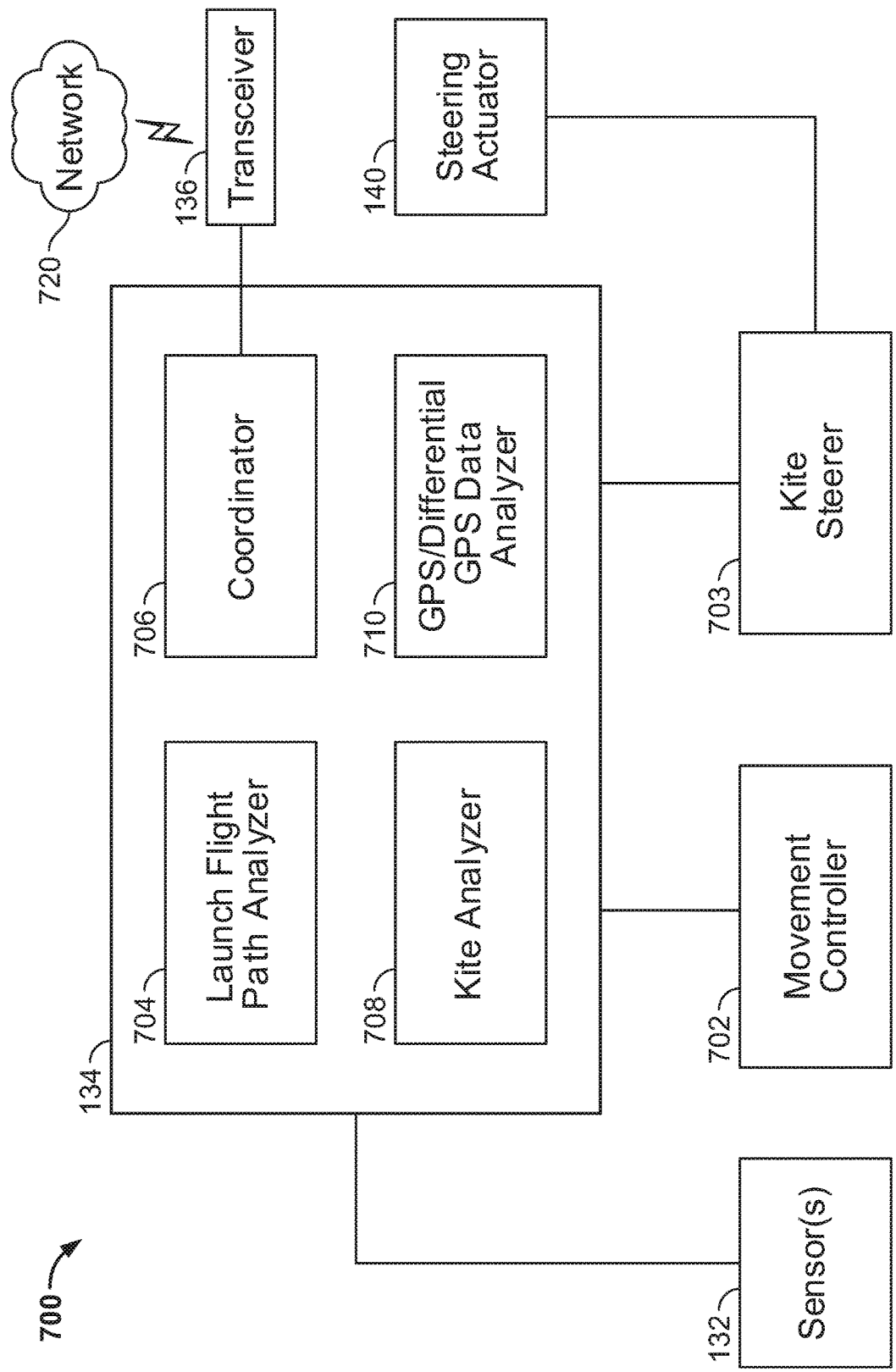
FIG. 7 is a schematic overview of a UAV deployment controller system that can be implemented in examples disclosed herein.

FIG. 7 is a schematic overview of a UAV deployment analysis system 700 that can be implemented in examples disclosed herein. The UAV deployment analysis system 700 of the illustrated example includes the movement analyzer 134, which is operatively and/or communicatively coupled to the sensor(s) 132, the transceiver 136, a movement controller 702 and a kite steerer 703 which, in turn, is communicatively coupled to the steering actuator 140. The example movement analyzer 134 includes a launch flight path analyzer 704, a coordinator 706, a kite analyzer 708 and a GPS/differential GPS analyzer 710. Further, in this example, the transceiver 136 is communicatively coupled to a network (e.g., a communication network, a navigation network, a UAV flight system network, etc.) 720.

In the illustrated example, the launch flight path analyzer 704 determines and/or calculates a desired launch flight path of the UAV 120. Additionally or alternatively, the launch flight path analyzer 704 determines a differential between a current position and/or orientation of the UAV 120 (e.g., a position of the UAV 120 on or related to the tether line 108) and the desired launch flight path.

The example coordinator 706 calculates movement of the kite 116 and/or the vessel 103 based on the aforementioned launch flight path of the UAV 120 to facilitate launch of the UAV 120 within a requisite threshold of the launch flight path.

The kite analyzer 708 of the illustrated example analyzes movement of the kite 116 to determine whether the kite 116 is at a sufficient height and/or orientation that is sufficiently close to the desired launch flight path.

In some examples, the GPS/differential GPS data analyzer 710 determines and/or analyzes GPS data associated with the UAV 120, the kite 116 and/or the vessel 103. Additionally or alternatively, the GPS/differential GPS data analyzer 510 determines and/or analyzes GPS data associated with the kite 116.

The example movement controller 702 directs movement of the control mount 102 (e.g., pivoting, translation and/or extension of the control mount 102), and/or the tension device 110 based on instructions from the movement analyzer 134. In this example, the movement controller 702 controls an amount of tension and/or direction of tension imparted by the tensioner 110 to the tether line 108 for deployment and/or stability of the UAV 120. In particular, the movement controller 702 controls a degree of tension of the tensioner 110 so that tether line 108 can be maintained within a requisite threshold tension range while the UAV 120 is suspended and/or supported therefrom.

While an example manner of implementing the UAV deployment analysis system 700 of FIG. 7 is illustrated in FIG. 7, one or more of the elements, processes and/or devices illustrated in FIG. 7 may be combined, divided, re-arranged, omitted, eliminated and/or implemented in any other way. Further, the example movement controller 702, the example kite steerer 703, the example launch flight path analyzer 704, the example coordinator 706, the example kite analyzer 708, the example GPS/differential GPS analyzer 710 and/or, more generally, the example UAV deployment analysis system 700 of FIG. 7 may be implemented by hardware, software, firmware and/or any combination of hardware, software and/or firmware. Thus, for example, any of the example movement controller 702, the example kite steerer 703, the example launch flight path analyzer 704, the example coordinator 706, the example kite analyzer 708, the example GPS/differential GPS analyzer 710 and/or, more generally, the example UAV deployment analysis system 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example movement controller 702, the example kite steerer 703, the example launch flight path analyzer 704, the example coordinator 706, the example kite analyzer 708, and/or the example GPS/differential GPS analyzer 710 is/are hereby expressly defined to include a non-transitory computer readable storage device or storage disk such as a memory, a digital versatile disk (DVD), a compact disk (CD), a Blu-ray disk, etc. including the software and/or firmware. Further still, the example UAV deployment analysis system 700 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
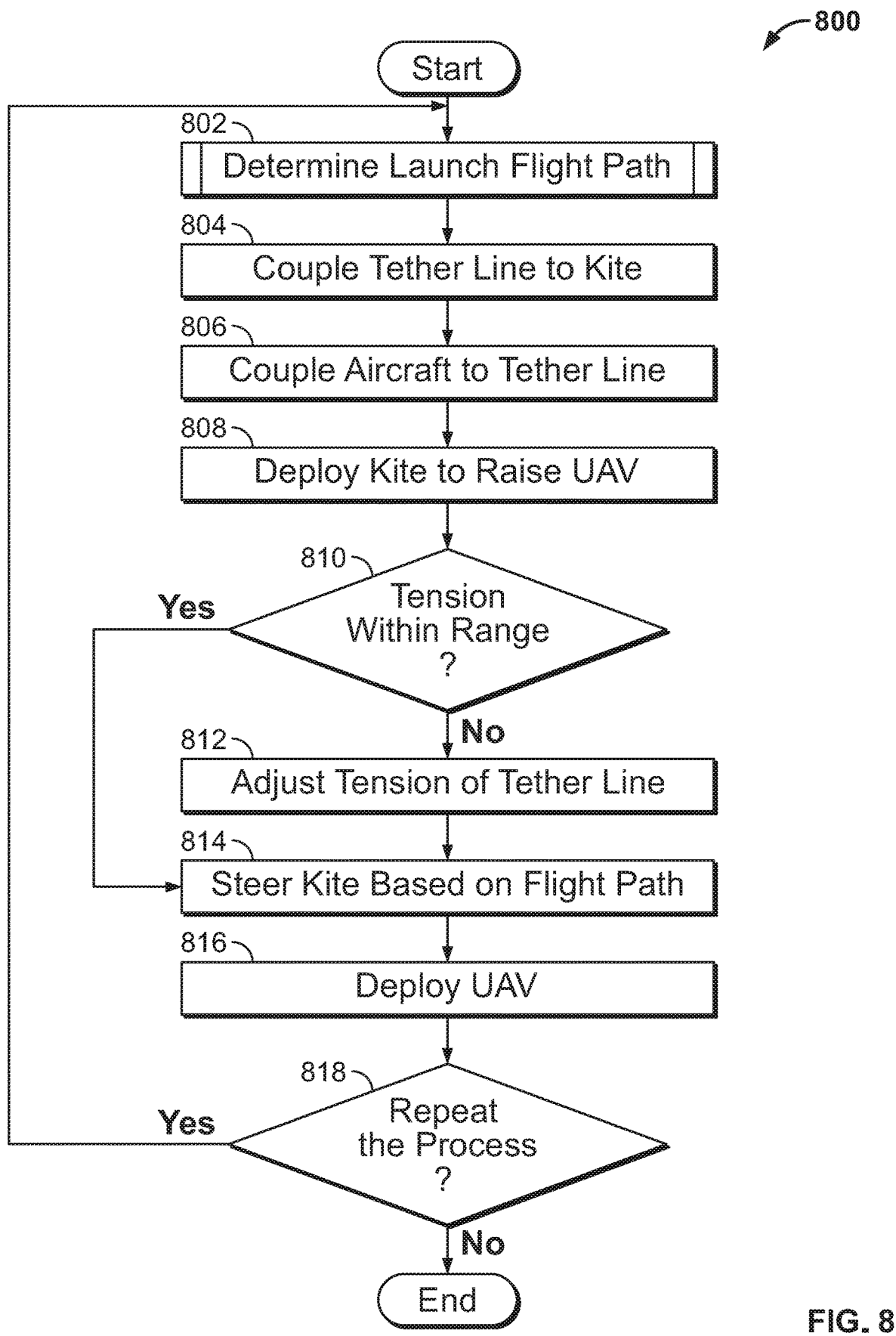
FIG. 8 is a flowchart representative of an example method to implement the example UAV deployment systems of FIGS. 1-4B and/or the UAV deployment controller system of FIG. 7.
Figure 9:
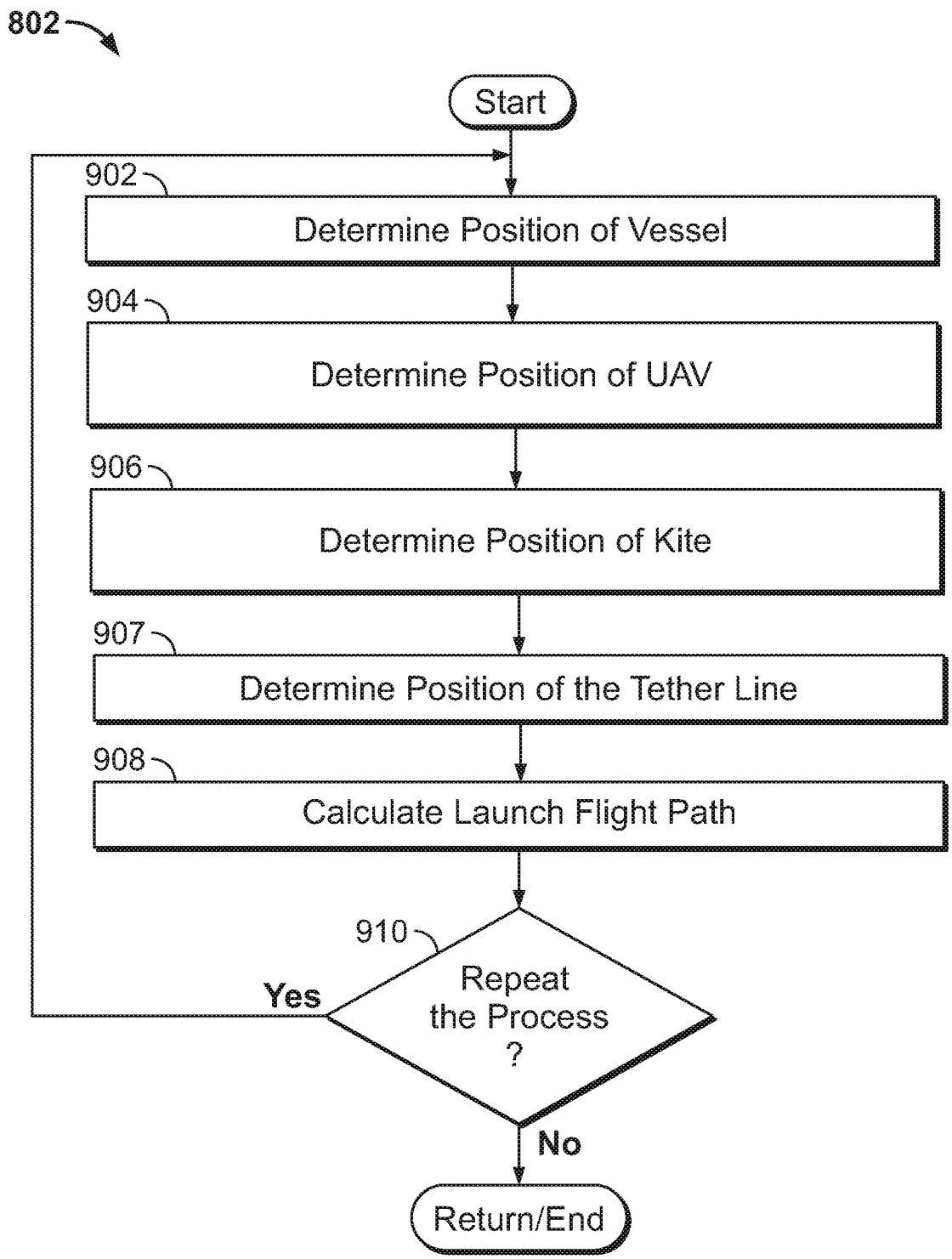
FIG. 9 is a flowchart representative of an example subroutine of the example method of FIG. 8.

Flowcharts representative of example hardware logic, machine readable instructions, hardware implemented state machines, and/or any combination thereof for implementing the UAV deployment analysis system 700 of FIG. 7 are shown in FIGS. 8 and 9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8 and 9, many other methods of implementing the example UAV deployment analysis system 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of an example method 800 to implement the example UAV deployment system 100 of FIG. 1, the UAV deployment system 200 of FIGS. 2A-2C, the UAV deployment system 300 of FIGS. 3A-3C, the UAV deployment system 400 of FIGS. 4A-4B and/or the UAV deployment analysis system 700 of FIG. 7. The example method 800 begins as the UAV 120 is to be deployed and/or launched for a mission.

At block 802, the launch flight path of the UAV 120 is determined. In this example, the launch flight path pertains to an orientation and height of the UAV 120 so that the UAV 120 can be deployed in an efficient manner (e.g., a time efficient manner, a fuel efficient manner, etc.).

In some examples, at block 804, the kite 116 is coupled to the tether line 108. The kite 116 and/or the support lines 117 of the kite 116 may be relatively flexibly coupled to the tether line 108 to enable relatively free movement of the kite 116.

At block 806, the UAV 120 is coupled (e.g., removably coupled) to the tether line 108. In this example, the UAV 120 is coupled to the tether line 108 via the attachment device 123.

At block 808, the kite 116 is deployed and/or raised from the vessel 103 to raise and/or suspend the tether line 108 and, thus, the UAV 120 relative to the vessel 103. In this example, the coordinator 706 causes the kite 116 to be deployed from the vessel 103.

At block 810, the movement controller 702 and/or the kite analyzer 708 determines whether a measured tension value of the tether line 108 measured by the sensor(s) 132 is within a predefined range. The range may be defined to ensure that there is adequate stability of the UAV 120 for deployment. If the tension is within the predefined range (block 810), control of the process proceeds to block 814. Otherwise, the process proceeds to block 812. In some examples, the tension is determined and/or measured by the tensioner 110.

If the tension is not within the predefined range (block 810), at block 812, the movement controller 702 controls the tensioner 110 to adjust the tension within the desired tension range and the process proceeds to block 814.

At block 814, in some examples, the kite analyzer 708 directs the kite steerer 703 to move the steering actuator 140 to steer the kite 116. In particular, the kite 116 can be moved along with the tether line 108 to increase a probability that the UAV 120 will be positioned and/or oriented toward the desired launch flight path.

At block 816, the UAV 120 is deployed from the tether line 108. In particular, the example release device 123 releases the UAV from the tether line 108 while the UAV 120 is suspended from the tether line 108 and the kite 116. In some other examples, the launch flight path analyzer 704 controls a speed and/or acceleration profile of a platform carrying the UAV 120 when the UAV 120 is being catapulted.

At block 818, it is determined whether to repeat the process. If the process is to be repeated (block 818), control of the process returns to block 802. Otherwise, the process ends. This determination may be based on whether additional ones of the UAV 120 are to be deployed.

FIG. 9 is a flowchart representative of the example subroutine 802 of the example method 800 of FIG. 8. The example subroutine 802 is implemented to enable adjustment of a position, displacement and/or orientation of the kite 116 and/or the tether line 108 to facilitate deployment of the UAV 120 therefrom toward a desired launch flight path.

At block 902, the GPS/differential GPS analyzer 710 of the illustrated example determines a position of the vessel 103. In particular, the position of the vessel can be based on GPS data measured at a GPS receiver of the vessel 103.

At block 904, in some examples, the coordinator 706 and/or the launch flight path analyzer 504 determines a relative position and/or an actual position of the UAV 120.

At block 906, additionally or alternatively, the example GPS/differential GPS analyzer 510 and/or the example kite analyzer 508 determines a position of the kite 116. In some such examples, a GPS receiver or transponder can be placed onto or proximate the kite 116 to determine the position of the kite 116. In some examples, a first position of the kite 116 relative to the vessel 103 and a second position of the vessel 103 (e.g., a GPS position of the vessel 103) are utilized (e.g., summed) to calculate a third position of the kite 116 (e.g., an actual position of the kite 116).

At block 907, in some examples, a position of the tether line 108 is determined by the kite analyzer 508. In some such examples, the kite analyzer 508 may determine a 3-D displacement and/or overall displacement of the tether line 108 (e.g., curvature along different portions of the tether line 108).

At block 908, the launch flight path analyzer 704 of the illustrated example calculates the launch flight path of the UAV 120. In this example, the launch flight path analyzer 704 utilizes a planned flight path (e.g., a mission flight path) in conjunction with the determined position of the vessel 103, the kite 116 and/or the tether line 108 to determine the launch flight path of the UAV 120 while the UAV 120 is suspended from the tether line 108.

At block 910, it is then determined whether to repeat the process. If the process is to be repeated, control of the process returns to block 902. Otherwise, the process ends/returns. This determination may be based on whether the tether line 108, the UAV 120 and/or the kite 116 is within a requisite positional range and/or orientation associated with the desired launch flight path.

Figure 10:
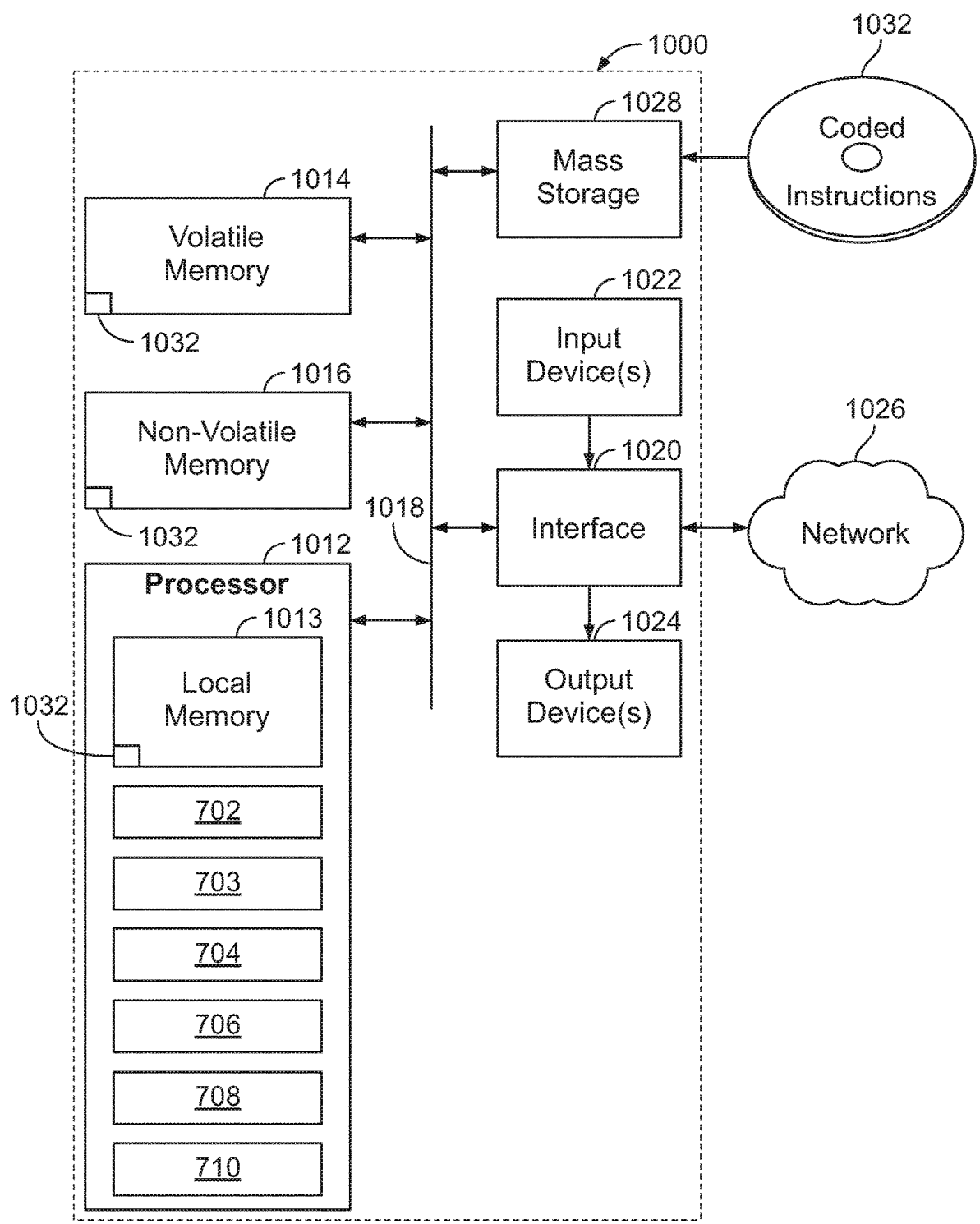
FIG. 10 is a block diagram of an example processing platform structured to execute the instructions of FIGS. 8 and 9 to implement examples disclosed herein.

FIG. 10 is a block diagram of an example processor platform 1000 structured to execute the instructions of FIGS. 9 and 10 to implement the UAV deployment analysis system 700 of FIG. 7. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example movement controller 702, the example kite steerer 703, the example launch flight path analyzer 704, the example coordinator 706, the example kite analyzer 708 and the example GPS/differential GPS analyzer 710.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 8 and 9 may be stored in the mass storage device 1028, in the volatile memory 1014, in the non-volatile memory 1016, and/or on a removable non-transitory computer readable storage medium such as a CD or DVD.

Example 1 includes an apparatus to deploy an unmanned aerial vehicle (UAV) includes a tether line to support the UAV, a tensioner operatively coupled to the tether line, and a kite operatively coupled to the tether line to support the tether line for deployment of the UAV.

Example 2 includes the apparatus as defined in example 1, where the kite includes a parafoil kite.

Example 3 includes the apparatus as defined in examples 1 or 2, where the tether line includes a first steering line and a second steering line, the first and second steering lines associated with steering the kite.

Example 4 includes the apparatus as defined in any of examples 1-3, further including a sensor to measure a first position of the kite relative to a vessel from which the tether line extends.

Example 5 includes the apparatus as defined in example 4, further including a kite analyzer to calculate a second position of the kite based on the first position and a third position of the vessel.

Example 6 includes the apparatus as defined in any of examples 1-5, where the tensioner is to maintain the tether line within a desired tension range prior to deploying the UAV from the tether line.

Example 7 includes the apparatus as defined in any of examples 1-6, further including a platform to carry the UAV.

Example 8 includes the apparatus as defined in example 7, where the platform is to move along the tether line to catapult the UAV.

Example 9 includes the apparatus as defined in example 7, where the UAV is to be raised by the platform and dropped from the platform.

Example 10 includes a method of deploying a UAV includes raising a tether line via a kite operatively coupled thereto, where the tether line is to support the UAV, and releasing the UAV to deploy the UAV.

Example 11 includes the method as defined in example 10, further including raising the UAV, via a platform, and wherein releasing the UAV includes dropping the UAV from the platform.

Example 12 includes the method as defined in examples 10 or 11, where releasing the UAV includes catapulting the UAV via a platform that is guided by and moves along the tether line.

Example 13 includes the method as defined in example 12, where the tether line on which the platform is guided is angled from the ground.

Example 14 includes the method as defined in any of examples 10-13, further including determining, via instructions executed by at least one processor, a first position of the kite relative to a vessel carrying the tether line.

Example 15 includes the method as defined in example 14, further including calculating, via instructions executed by the at least one processor, a second position of the kite based on the first position and a third position of the vessel.

Example 16 includes the method as defined in any of examples 10-15, further including steering the kite based on a desired launch flight path of the UAV.

Example 17 includes the method as defined in example 16, wherein steering the kite includes controlling first and second steering lines extending through the tether line.

Example 18 includes a non-transitory machine readable medium includes instructions, which when executed, cause a processor to determine a position of at least one of a tether line or a kite supporting the tether line, where the tether line supports a UAV, and direct movement of the kite based on a desired launch flight path of the UAV.

Example 19 includes the non-transitory machine readable medium as defined in example 18, where the instructions further cause the processor to determine whether the UAV is within a threshold range of the desired flight path, and cause the UAV to be deployed from the tether line in response to the UAV being within the threshold range of the desired flight path.

Example 20 includes the non-transitory machine readable medium as defined in examples 18 or 19, where the position of the kite is determined based on a first position of the kite relative to a vessel carrying the tether and a second position of the vessel.

From the foregoing, it will be appreciated that example methods, apparatus and articles of manufacture have been disclosed that provide an effective and relatively low cost manner of deploying a UAV. Examples disclosed herein can also be used to effectively adjust a position of a tether line to be oriented toward a launch flight path of the UAV, thereby accounting for numerous variables (e.g., movement of a launch vessel, winds, etc.) to more accurately orient and/or position the UAV based on a desired launch flight path of the UAV.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of UAVs, examples disclosed herein can be implemented in any appropriate type of vehicle (e.g., spacecraft, watercraft, etc.) and/or other types of aircraft (e.g., manned aircraft).

The following claims are hereby incorporated into this Detailed Description by this reference, with each claim standing on its own as a separate embodiment of the present disclosure.

What is claimed is:

1. An apparatus to deploy an unmanned aerial vehicle (UAV), the apparatus comprising:
    a tether line to support the UAV;
    a tensioner operatively coupled to the tether line;
    a kite operatively coupled to the tether line to support the tether line for deployment of the UAV;
    a platform to carry the UAV, wherein movement of the platform is guided by the tether line to catapult the UAV; and
    a release positioned on the platform to release the UAV when the UAV reaches a launch position as the UAV is catapulted.

2. The apparatus as defined in claim 1, wherein the kite includes a parafoil kite.

3. The apparatus as defined in claim 1, wherein the tether line includes a first steering line and a second steering line, the first and second steering lines associated with steering the kite.

4. The apparatus as defined in claim 1, further including a sensor to measure a first position of the kite relative to a vessel from which the tether line extends.

5. The apparatus as defined in claim 4, further including a kite analyzer to calculate a second position of the kite based on the first position and a third position of the vessel.

6. The apparatus as defined in claim 1, wherein the tensioner is to maintain the tether line within a desired tension range prior to deploying the UAV from the tether line.

7. The apparatus as defined in claim 1, wherein the UAV is to be raised by the platform and catapulted at the launch position.

8. The apparatus of claim 1, further including:
a pulley operatively coupled to the tether line; and
a fixed mount operatively couple to the tether line, the pulley positioned on the tether line between the kite the mount.

9. The apparatus of claim 8, wherein the tether line is angled from the ground at a tether line angle based on relative positioning between the pulley and the mount.

10. The apparatus of claim 9, wherein the tether line angle changes as the UAV is catapulted.

11. The apparatus of claim 8, wherein a portion of the tether line proximate the UAV rotates relative to the pully.

12. A method of deploying an unmanned aerial vehicle (UAV), the method comprising:
raising a tether line via a kite operatively coupled thereto, wherein the tether line is to support the UAV;
coupling the UAV to platform that is guided by the tether line to catapult the UAV; and
releasingthe UAV via a release device positioned on the platform to catapult the UAV when the UAV reaches a launch position.

13. The method as defined in claim 12, further including raising the UAV, via the platform, to the launch position.

14. The method as defined in claim 12, wherein the tether line on which the platform is guided is angled from the ground.

15. The method as defined in claim 12, further including determining, via instructions executed by at least one processor, a first position of the kite relative to a vessel carrying the tether line.

16. The method as defined in claim 15, further including calculating, via instructions executed by the at least one processor, a second position of the kite based on the first position and a third position of the vessel.

17. The method as defined in claim 12, further including steering the kite based on a desired launch flight path of the UAV.

18. The method as defined in claim 17, wherein steering the kite includes controlling first and second steering lines extending through the tether line.

19. A non-transitory machine readable medium comprising instructions, which when executed, cause a processor to at least:
determine a position of at least one of a tether line or a kite supporting the tether line, wherein the tether line supports an unmanned aerial vehicle (UAV);
direct movement of the kite based on a desired launch flight path of the UAV;
cause movement of the UAV via a platform guided by the tether line; and
cause the UAV to be released from the platform via a release to catapult the UAV when the UAV reaches a launch position.

20. The non-transitory machine readable medium as defined in claim 19, wherein the instructions further cause the processor to:
determine whether the UAV is within a threshold range of the desired flight path; and
cause the UAV to be released from the platform in response to the UAV being within the threshold range of the desired flight path.

21. The non-transitory machine readable medium as defined in claim 19, wherein the position of the kite is determined based on a first position of the kite relative to a vessel carrying the tether and a second position of the vessel.

* * * * *